United States Patent
Ahn

(10) Patent No.: US 9,471,174 B2
(45) Date of Patent: Oct. 18, 2016

(54) CONTROL APPARATUS AND METHOD OF ADDRESSING TWO-DIMENSIONAL SIGNAL

(71) Applicant: Electronics and Telecommunications Research Institute, Daejeon (KR)

(72) Inventor: Chang-Geun Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 94 days.

(21) Appl. No.: 14/320,418

(22) Filed: Jun. 30, 2014

(65) Prior Publication Data
US 2015/0002430 A1    Jan. 1, 2015

(30) Foreign Application Priority Data

Jul. 1, 2013  (KR) .................. 10-2013-0076622
Jan. 23, 2014  (KR) .................. 10-2014-0008466

(51) Int. Cl.
G02F 1/1343  (2006.01)
G06F 3/041  (2006.01)
G02F 1/1362  (2006.01)

(52) U.S. Cl.
CPC ......... G06F 3/0416 (2013.01); G02F 1/13439 (2013.01); G02F 1/134309 (2013.01); G02F 1/134336 (2013.01); G02F 1/136286 (2013.01)

(58) Field of Classification Search
CPC ............ G06F 2203/04107; G06F 3/041; G06F 3/0416; G02F 1/1343; G02F 1/134336; G02F 1/136286; G02F 1/134309; G02F 1/13439; G02F 1/13
See application file for complete search history.

(56) References Cited

U.S. PATENT DOCUMENTS

| | | | | |
|---|---|---|---|---|
| 7,554,149 B2* | 6/2009 | Kim | ...................... | H01L 27/115 257/315 |
| 9,019,231 B2* | 4/2015 | Minami | .................. | G06F 3/044 345/173 |
| 9,112,058 B2* | 8/2015 | Bao | ......................... | H01L 29/84 |
| 9,268,988 B2* | 2/2016 | Benkley, III | .......... | G01N 27/04 |
| 2003/0080744 A1* | 5/2003 | Goldfine | ................ | G01V 3/088 324/345 |
| 2009/0050376 A1* | 2/2009 | Jeon | ...................... | G06F 3/0416 178/18.03 |
| 2010/0085324 A1* | 4/2010 | Noguchi | ................. | G06F 3/044 345/174 |
| 2010/0117193 A1* | 5/2010 | Inoue | ................... | H01L 23/5223 257/532 |
| 2011/0102698 A1* | 5/2011 | Wang | .................. | G02F 1/13338 349/54 |
| 2012/0038583 A1* | 2/2012 | Westhues | .............. | G06F 3/0412 345/174 |
| 2013/0257784 A1* | 10/2013 | Vandermeijden | ....... | G06F 3/044 345/174 |
| 2013/0271160 A1* | 10/2013 | Solven | .................... | G06F 3/041 324/661 |
| 2014/0022187 A1* | 1/2014 | Jeong | ..................... | G06F 3/041 345/173 |
| 2014/0152621 A1* | 6/2014 | Okayama | .............. | G06F 3/0416 345/174 |
| 2014/0218334 A1* | 8/2014 | Shibata | ................... | G06F 3/044 345/174 |

* cited by examiner

Primary Examiner — William Boddie
Assistant Examiner — Bryan Earles

(57) ABSTRACT

Provided is a control apparatus which may apply an electric signal to a specific point or area selected from a plane or may receive the signal from the specific point or area. The control apparatus includes an upper electrode and a lower electrode. When it is intended that an electric field is applied to a point in which the upper electrode and the lower electrode come in contact with each other, an electrical bias is applied to the lower electrode, and the upper electrode is maintained in a non-connected state. When it is intended that the bias is selectively applied, the upper electrode is maintained in a grounded state. Therefore, transferring of the field from the lower electrode to a ground electrode disposed at a bottom is shielded, and thus transferring of the electric signal is also blocked.

11 Claims, 5 Drawing Sheets

CONTROL APPARATUS AND METHOD OF ADDRESSING TWO-DIMENSIONAL SIGNAL

CROSS-REFERENCE TO RELATED APPLICATIONS

This U.S. non-provisional patent application claims priority under 35 U.S.C. §119 to Korean Patent Application Nos. 10-2013-0076622, filed on Jul. 1, 2013, and 10-2014-0008466, filed on Jan. 23, 2014, the entire contents of which are hereby incorporated by reference.

BACKGROUND OF THE INVENTION

The present invention disclosed herein relates to a control apparatus, and more particularly, to a control apparatus and method of two-dimensionally addressing a signal, in which an electric signal is applied to a specific point or area selected on a two-dimensional plane to receive a signal from the specific point or area.

In a device having a predetermined type two-dimensional cell arrangement, such as LCD flat panel displays, memory chips and touch panels, it is necessary to two-dimensionally address an electric signal in order to separately control each cell. The easiest method of separately controlling a two-dimensional cell array is to electrically wire all of the cells. However, as the number of cells to be controlled is increased, a two-dimensional arrangement of the wirings becomes complicated, and a driving circuit thereof also becomes complicated, and finally the arrangement becomes impossible.

In a technique which is the most widely applied currently to solve the problem, a switching element such as a transistor is connected to each cell so as to turn on a switch corresponding to the cell to be driven and thus to apply an electric signal to the corresponding cell or allow the corresponding cell to output the electric signal. In case of a DRAM, the wirings are divided into a word line and a bit line. The word line is connected to a gate portion of a transistor connected with a capacitor having information so as to determine on/off of the switch.

In case of an ON state, information of the bit line is transferred to each selected capacitor, or information of the capacitor is read to an outside through the bit line.

The LCD flat panel display also has similar operation principles.

When the electric signal is two-dimensionally addressed using the switching element, a main issue is that such device may be configured only with a material with which the switching element may be manufactured. Most of the switch elements are semiconductor-based elements such as the transistors, and thus have to be manufactured on a semiconductor substrate or a semiconductor thin film.

In the majority of cases, to manufacture the switching element having good switching properties, a semiconductor process at high temperature is required. Therefore, it is difficult to manufacture the switching device on a substrate formed of plastic, glass or the like which may not endure the high temperature, and thus it is also difficult to embody the two-dimensional addressing of the electric signal using the switching element.

The touch panel is another device which requires the two-dimensional addressing. The touch panel which may detect a touched position on a flat panel surface is configured in various manners.

In the touch panel, the device is configured to recognize a position on a two-dimensional plane through various signal changes when an object is in contact with the specific position on a surface of the touch panel. One of the most widely used methods is a resistive touch panel. In the resistive touch panel, a transversal electrode arrangement and a longitudinal electrode arrangement are disposed up and down. An embossing space is arranged between the up and down electrode arrangements. When a predetermined pressure is applied by the object, the upper electrode and the lower electrode are in contact with each other, and thus a change in a current flow occurs, and the position on plane coordinates may be recognized by a resulting value thereof.

The method is characterized by being configured only with the upper and lower electrode arrangements without using of the switching element in order to recognize the position on the two-dimensional plane coordinates. However, this method is not a field control method, but a method of obtaining information through the change in the current flow. And this method is characterized in that only information on the position of a contacted area may be recognized, but a signal may not be applied to the specific point or area.

As described above, the typical technique has a disadvantage in that an electric circuit should be configured by grafting the switching element, which is complicated and restricted in the substrate material, in order to apply the electric signal to the specific point on the two-dimensional plane coordinates or receive the signal therefrom.

At present, it may be very difficult to configure a structure capable of controlling the electric signal on the two-dimensional plane coordinates only by arranging the simple electrode arrangements such as the electrode arrangement structure of the resistive touch panel.

SUMMARY OF THE INVENTION

The present invention provides a control apparatus and method of two-dimensionally addressing a signal, which may control each cell in an array with a configuration of a simple transversal electrode arrangement and longitudinal electrode arrangement without a complicated switching element.

The present invention also provides a control apparatus and method of two-dimensionally addressing a signal, which may separately control each cell in a device having a two-dimensional cell array using a field shielding effect.

Embodiments of the present invention provide control apparatuses for two-dimensionally addressing a signal including a bottom electrode disposed under a control target to be spaced apart, a first electrode part disposed above the control target and arranged in a first direction to define a plurality of device cells in an array shape, and a second electrode part configured to define the plurality device cells together with the first electrode part at a plurality of crossover points and arranged in a second direction perpendicular to the first direction to selectively generate a field shielding effect at the plurality of crossover points according to a biasing condition.

In other embodiments of the present invention, control apparatuses for two-dimensionally addressing a signal including a bottom electrode disposed under a piezo material or an liquid crystal device to be spaced apart, a lower electrode part disposed above the piezo material or the liquid crystal device and arranged in a first direction to define a plurality of device cells in an array shape, and an upper electrode part configured to define the plurality device cells together with the lower electrode part at a plurality of crossover points and arranged in a second direction perpendicular to the first direction to selectively generate a field shielding effect at the plurality of crossover points according to a biasing condition.

In still other embodiments of the present invention, control methods of two-dimensionally addressing a signal including disposing a bottom electrode under a control target to be spaced apart, preparing a lower electrode and an upper electrode above the control target, and maintaining the upper electrode in a floating state and applying an electrical bias to the lower electrode when it is intended that an electric field is generated at a point in which the upper electrode and the lower electrode come in contact with each other.

In even other embodiments of the present invention, control methods of two-dimensionally addressing a signal including disposing a bottom electrode under a control target to be spaced apart, installing a lower electrode and an upper electrode above the control target in an array shape, and when it is intended that transferring of the field to a device cell provided at the point in which the upper electrode and the lower electrode come in contact with each other is shielded, a ground voltage is applied to the upper electrode in a state in which the electric bias is applied to the lower electrode, and thus the transferring of the field from the lower electrode to the bottom electrode is shielded.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
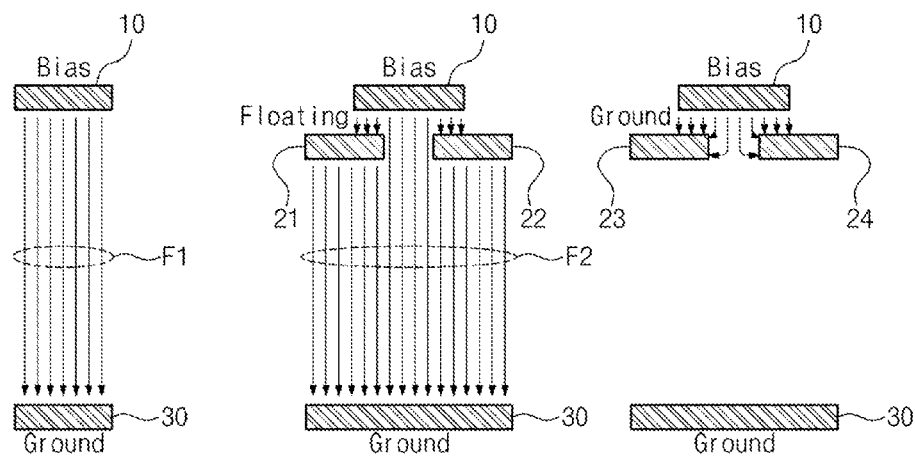
FIG. 1 is a view exemplarily illustrating a basic principle of an electric field shielding for two-dimensionally addressing an electric signal in accordance with the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

A control apparatus for two-dimensionally addressing an electric signal according to the present invention basically includes upper electrodes 23 and 24 (referring to FIG. 2) and a lower electrode 10 (referring to FIG. 2), and a point in which the upper electrode and the lower electrode come in contact with each other is a point in which the electric signal has to be controlled. When it is intended to apply an electric field to the point, an electrical bias is applied to the lower electrode 10 (referring to FIG. 2), and the upper electrodes are maintained in a non-contacted (e.g., floating) state, such that the field is transferred from the bias of the lower electrode 10 to a bottom electrode 30 disposed at a bottom.

When it is intended that the electrical bias is not applied, the bias is not applied to the electrode. If it is necessary to select a state in which the bias is applied or not applied, the upper electrode 25 (referring to FIG. 2) is used for a ground in a state in which the bias is applied to the lower electrode 10, and thus the field is blocked (shielded) from being transferred from the lower electrode 10 to the bottom electrode 30 disposed at the bottom. Therefore, the transferring of the electric signal at the point is blocked.

A control target 28 such as a piezo element or a liquid crystal device is disposed above the bottom electrode 30 used for the ground.

Therefore, when the field is blocked (shielded) from being transferred from the lower electrode 10 to the bottom electrode 30, the piezo element is not affected by the field, and thus driving is disabled. Meanwhile, when the field is transferred from the lower electrode 10 to the bottom electrode 30, the piezo element is affected by the field and thus the driving is enabled. Therefore, the control apparatus for two-dimensionally addressing the electric signal according to the present invention is simply configured with a transversal electrode arrangement and a longitudinal electrode arrangement without a complicated switching element, and is a new type control apparatus for two-dimensionally addressing the electric signal, which may separately control each cell in a device having a two-dimensional cell array using the field shielding effect. FIG. 1 is a view exemplarily illustrating a basic principle of the electric field shielding for two-dimensionally addressing the electric signal in accordance with the present invention.

Referring to FIG. 1, as illustrated in the far-left of the drawing, in the case that a voltage is applied between the two electrodes 10 and 30, if the same medium is uniformly distributed between the two electrodes 10 and 30, the potential appears from the bias toward the ground as designated by a reference numeral F1.

Referring to the middle drawing, as illustrated in the drawing, control electrodes 21 and 22 as the upper electrodes are arranged under the lower electrode 10 to which the bias is applied. Like this, even though the control electrodes 21 and 22 are arranged, if the electrodes 21 and 22 are in the floating state, the field F2 is transferred from the bias electrode 10 to the ground electrode 30 disposed at the bottom. Finally, in the floating state, it is impossible to prevent the transferring of the field.

However, as illustrated in the far-right of the drawing, in the case that the control electrodes 23 and 24 as the upper electrodes are in the grounded state, field distribution is changed a lot, compared with the middle drawing. The field from the bias electrode 10 as the lower electrode is not transferred to the ground electrode 30 disposed at the bottom, but may be absorbed to the control electrodes 23 and 24 as the upper electrodes.

Therefore, it may be considered to design the control electrodes 23 and 24 in order to shield the entire field transferred to the ground electrode 30 disposed at the bottom. In this case, the transferring of the field to the bottom electrode 30 may be On/Off by controlling the control electrodes 23 and 24. The present invention is to two-dimensionally control the electric signal using this property.

Figure 2:
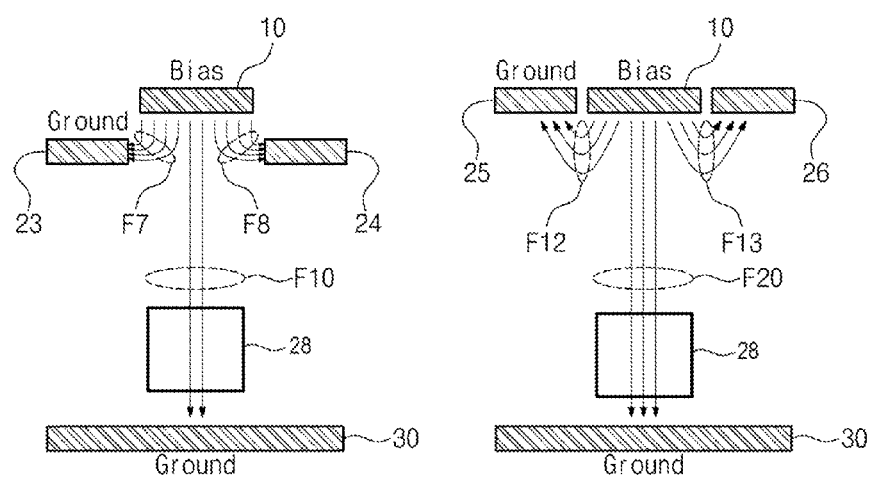
FIG. 2 is a view exemplarily illustrating field distribution when a control electrode is disposed not to be overlapped with a bias electrode in an up and down direction in accordance with the present invention.

FIG. 2 is a view exemplarily illustrating field distribution when the control electrode is disposed not to be overlapped with the bias electrode in an up and down direction in accordance with the present invention.

Figure 3:
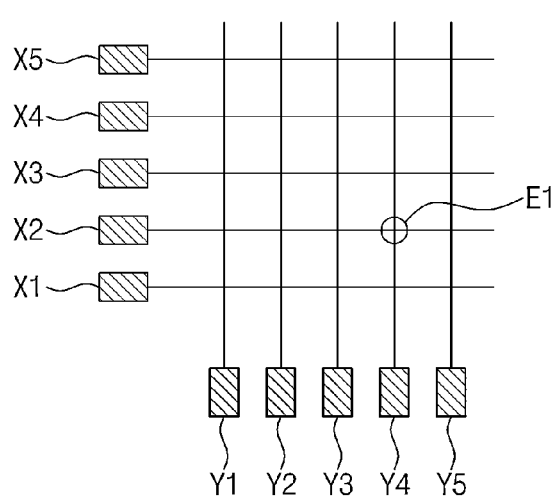
FIG. 3 is a view exemplarily illustrating an electrode arrangement for controlling an electric field two-dimensionally arranged at a specific point and an electrode cross-section of the point in accordance with the present invention.
Figure 3:
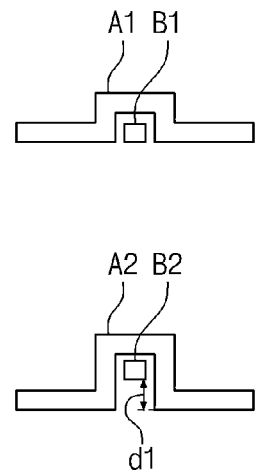

Referring to FIG. 2, as a distance between the control electrodes 23 and 24 named as the upper electrodes in FIG. 3 becomes smaller, it is easier to completely shield the field. However, in the case that is it necessary to control a wider area, it is difficult to unlimitedly reduce the distance between the control electrodes. Further, in the case that the control electrodes are substantially defined by a semiconductor process or the like, it is difficult to define the control electrodes to be overlapped under the bias electrode 10, and thus as illustrated in the right side of the FIG. 2, the control electrodes may be designed not to be overlapped. Assuming that there is a difficult constraint condition, a control variable is a depth of each control electrode 25, 26. As illustrated in the left side of FIG. 2, as the control electrodes 25 and 26 are disposed at a relatively lower side of the bias electrode 10, it is easier to shield the field.

FIG. 3 is a view exemplarily illustrating an electrode arrangement for controlling the electric field two-dimensionally arranged at the specific point and an electrode cross-section of the point in accordance with the present invention.

Referring to FIG. 3, in the case that there is an array type electrode arrangement in X-axial and Y-axial directions, a crossover point as designated by E1 is surely generated. In order for the two upper and lower electrodes to be not disconnected with each other, the electrodes have to be defined as illustrated in the right side of the drawing. Here, an electrode A1 which is crossed upward over is the control electrode, and a lower electrode B1 is the bias electrode. Therefore, the control electrode is the upper electrode, and the bias electrode is the lower electrode. Finally, three surfaces of the lower electrode B1 are enclosed by the upper electrode A1. An upper cross-section of FIG. 3 shows that the vertically lowest portion of the lower electrode is located on the same horizontal position as that of the upper electrode.

If necessary, the control electrode may be disposed to be deeper than the bias electrode B1 by a depth d1. A lower cross-section of FIG. 3 shows that the vertically lowest portion of the lower electrode is located at a higher position than that of the upper electrode.

In FIG. 3, the upper electrode is defined by X1 to X5, and the lower electrode is defined by the Y1 to Y5.

When it is intended that the field is generated at only a point E1 of FIG. 3, a voltage is applied to only a bias line Y4 of the corresponding point, and the rest bias lines Y1, Y2, Y3 and Y5 are grounded. Further, a line X2 of the corresponding point E1 is maintained in the floating state, and the rest lines X1 and X3 to X5 are grounded. Then, the field generated at the point E1 by the bias electrode is transferred to the bottom electrode 30 of FIG. 2, and the field shielding occurs at all of the rest crossover points. Therefore, the control target 28 which is located at a predetermined position may be controlled.

Figure 4:
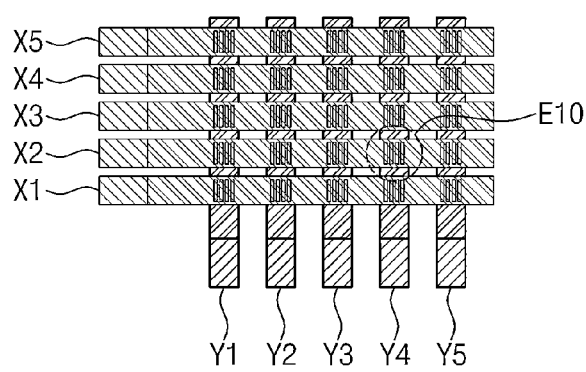
FIG. 4 is a view exemplarily illustrating an electrode arrangement for controlling an electric field two-dimensionally arranged at a specific area and an electrode cross-section of the area in accordance with the present invention.
Figure 4:
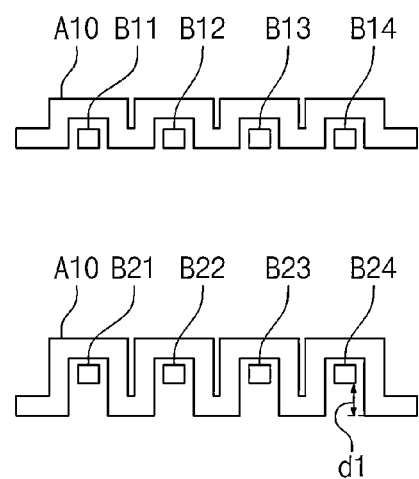

FIG. 4 is a view exemplarily illustrating an electrode arrangement for controlling the electric field two-dimensionally arranged at the specific area and an electrode cross-section of the area in accordance with the present invention.

Referring to FIG. 4, the control operation may be performed in the same manner as in FIG. 3. However, it may be difficult to control the area having a relatively very wide surface area with only the shape of the control electrode of FIG. 3. In this case, as illustrated in the drawing, a groove having a predetermined size which may control the field is provided at the specific area. That is, one bias electrode is divided into multiple parts. Finally, it is configured that the control electrode A10 is provided to be crossed over, as illustrated in the right cross section of FIG. 4, and thus the wide area may be controlled. In this case, a width of the bias electrode B11, a width of the control electrode A10, a depth of the control electrode, a distance between the bias electrode and the control electrode and the like are variables. Therefore, it requires that the design is performed with conditions which may the most easily control the field.

In the case that the upper electrode is divided into multiple sub electrodes B11, B12, B13 and B14, the upper electrode is defined to enclose the sub electrodes, as illustrated in the cross-section of the FIG. 4.

Figure 5A:
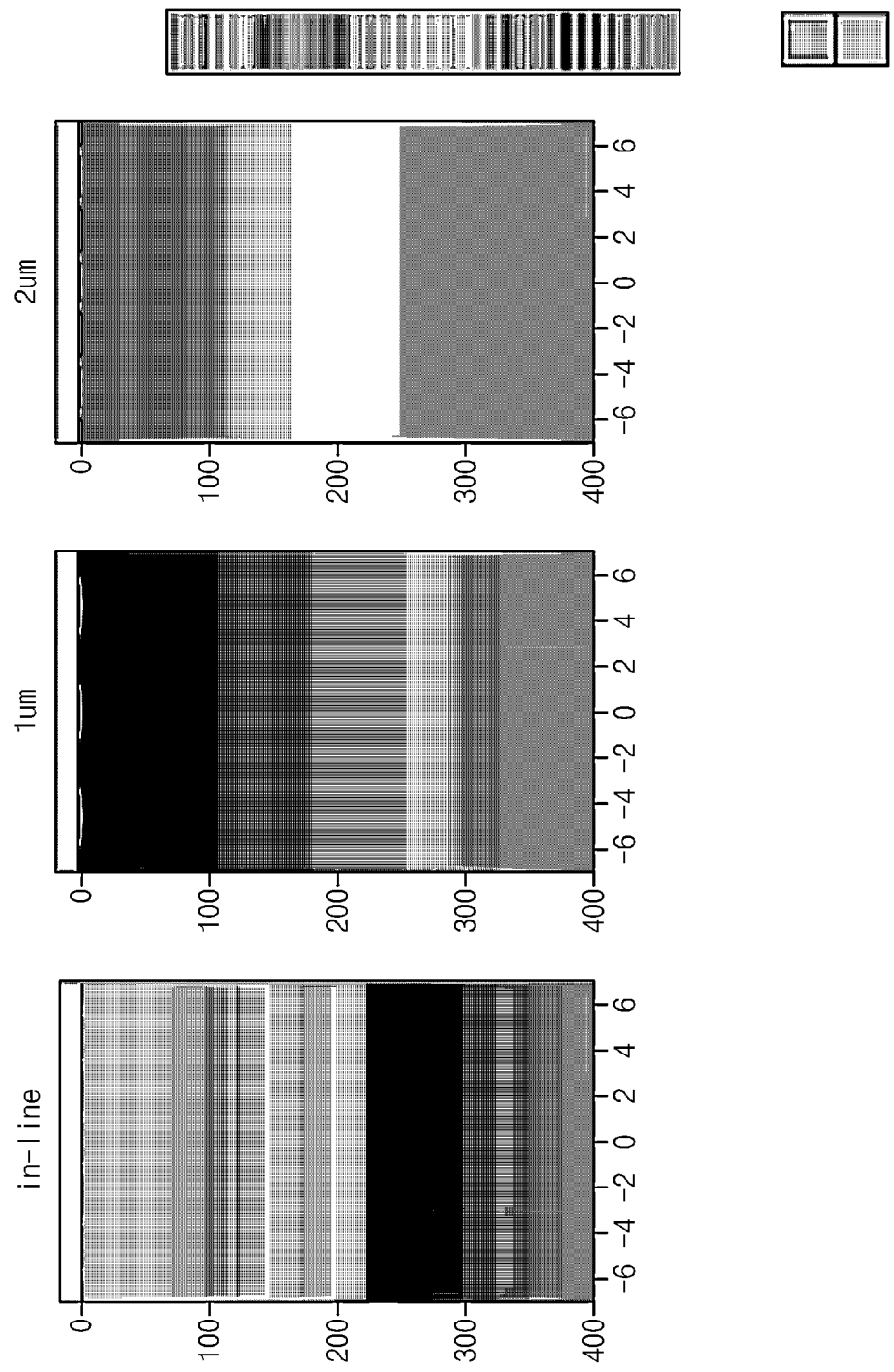
FIGS. 5A and 5B are views exemplarily illustrating a result of a field simulation showing field dependence according to a depth of a control electrode in accordance with the present invention.
Figure 5B:
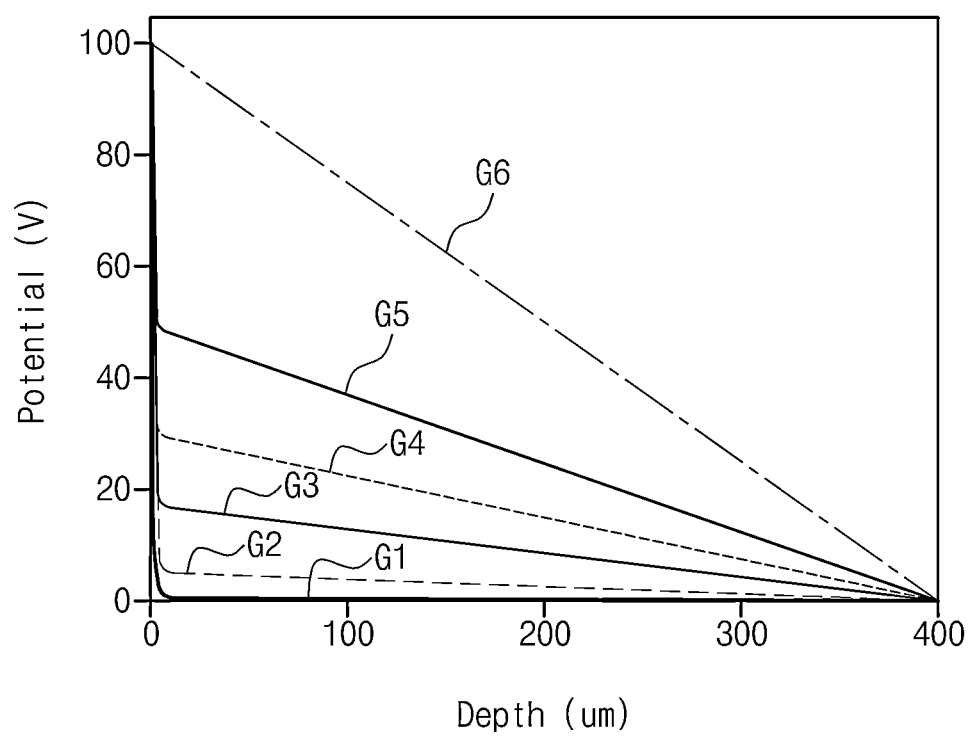

FIG. 5 is a view exemplarily illustrating a result of a field simulation showing field dependence according to a depth of the control electrode in accordance with the present invention.

Referring to FIG. 5, as confirmed through a graph G6, when the control electrode is in the floating state, the field applied to the control target is hardly affected. However, when the control electrode is grounded, the field applied to the control target is affected. In this case, it is confirmed through graphs G1 to G5 that the degree of the field shielding is varied according to the design (the depth in FIG. 5) of the control electrode. In the drawing, a transversal axis is a depth of the control target from the bias electrode toward the ground electrode disposed at the bottom, and a longitudinal axis is the potential.

Eventually, as shown in the graph G6, when the control electrode is in the floating state, the voltage is uniformly and proactively reduced between the bias electrode and the ground electrode at the bottom. However, when the control electrode is in the grounded state, the field shielding occurs. If a relative depth of the control electrode with respect to the bias electrode is greater than a width of the bias electrode, most of the field is shielded. Therefore, it may be understood that the potential has a value near to zero at the most of areas between the bias electrode and the ground electrode disposed at the bottom.

The graph G1 in FIG. 5 shows that the field shielding occurs substantially completely, compared with another graphs G2 to G5.

This result shows that the field of the desired specific point or area may be switched on/off by the arrangement of the bias electrode and the control electrode as proposed in the present invention.

Figure 6:
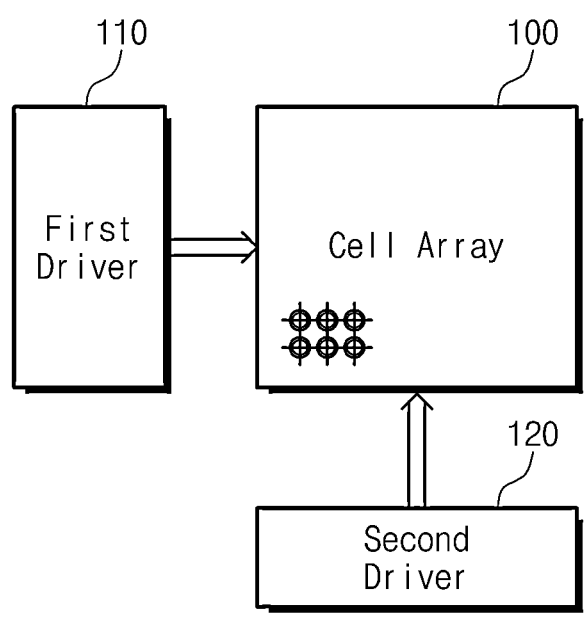
FIG. 6 is a block diagram illustrating a control apparatus in accordance with the present invention.

FIG. 6 is a block diagram illustrating the control apparatus in accordance with the present invention.

Referring to FIG. 6, first and second driving parts 110 and 120 and a cell array 100 are shown. When the first driving part 110 drives a transversal line of FIG. 3, the second driving part 120 may drive a longitudinal line of FIG. 3.

As illustrated in FIGS. 3 and 4, the cell array 100 may be an array configured with only the upper and lower electrodes without installation of the switching element. The cell array 100 may be a touch panel, an LCD or a control device.

According to the control apparatus for two-dimensionally controlling the electric signal of the present invention, it is not necessary to additionally define a switching element for each cell in order to separately control the two-dimensionally configured cells. That is, it is configured with the simple transversal electrode arrangements and longitudinal electrode arrangements. Further, the present invention uses a manner capable of separately controlling each cell in the device having the two-dimensional cell arrays using the field shielding effect. Therefore, the present invention may have a simple configuration, improved durability and very low manufacturing cost, and also may be easily configured with various materials such as semiconductor substrates, glass and plastic.

Further, according to the control apparatus of the present invention, since the area capable of being controlled is increased, it has very high extendability.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A control apparatus for two-dimensionally addressing a signal, the apparatus comprising:
    a control target,
    a bottom electrode disposed under the control target;
    a first electrode part disposed above the control target and arranged in a first direction; and
    a second electrode part disposed above the control target and arranged in a second direction perpendicular to the first direction,
    wherein the first electrode part and the second electrode part are configured to define a plurality of device cells at a plurality of crossover points of the first and second electrode parts, and
    wherein the second electrode part controls, according to a bias condition, a field applied to the control target by selectively generating a field shielding effect at the plurality of crossover points.

2. The control apparatus of claim 1, wherein three surfaces of the first electrode part are enclosed by the second electrode part.

3. The control apparatus of claim 1, wherein a vertically lowest portion of the first electrode part is provided at a higher position than a vertically lowest portion of the second electrode.

4. The control apparatus of claim 1, wherein a vertically lowest portion of the first electrode is provided on the same horizontal position as a vertically lowest portion of the second electrode.

5. The control apparatus of claim 1, wherein, when the first electrode part is divided into a plurality of sub electrodes, the second electrode part is provided to enclose the sub electrodes.

6. A control apparatus for two-dimensionally addressing a signal, the apparatus comprising:
    a control target including a piezo material or a liquid crystal device;
    a bottom electrode disposed under the control target;
    a lower electrode part disposed above the control target and arranged in a first direction; and
    an upper electrode part disposed above the control target and arranged in a second direction perpendicular to the first direction,
    wherein the upper and lower electrode parts are configured to define a plurality device cells together at a plurality of crossover points, and
    wherein the upper electrode part is configured to control, according to a biasing condition, the control target by selectively generating a field shielding effect at the plurality of crossover points.

7. The control apparatus of claim 6, wherein the lower electrode part is an electrode to which a bias voltage is applied.

8. The control apparatus of claim 7, wherein the upper electrode part is an electrode which is in a floating state or to which a ground voltage is applied.

9. A control method of two-dimensionally addressing a signal, the method comprising:
    providing a control target;
    disposing a bottom electrode under the control target;
    providing a lower electrode above the control target;
    providing an upper electrode above the control target and disposed orthogonally to the lower electrode;
    maintaining the upper electrode in a floating state and applying an electrical bias to the lower electrode when an electric field is to be applied to the control target; and
    applying a ground voltage to the upper electrode and applying the electrical bias to the lower electrode when the electric field is not to be applied to the control target.

10. The method of claim 9, wherein a vertically lowest portion of the lower electrode part is located at a higher position than a vertically lowest portion of the upper electrode part, or
    the vertically lowest portion part of the lower electrode is located on the same horizontal position as the vertically lowest portion of the upper electrode part.

11. The method of claim 9, wherein the control target is a piezo element configured to generate vibration by the field.

* * * * *